E. P. HINCKS.
TACK.
No. 170,854. Patented Dec. 7, 1875.
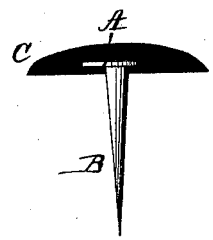
WITNESSES
Franck L. Outland
C. L. Evert
INVENTOR
Enoch P Hincks
By Alexander Mason
Attorney

UNITED STATES PATENT OFFICE.

ENOCH P. HINCKS, OF BRIDGEPORT, CONNECTICUT.

IMPROVEMENT IN TACKS.

Specification forming part of Letters Patent No. 170,854, dated December 7, 1875; application filed October 4, 1875.

*To all whom it may concern:*

Be it known that I, ENOCH P. HINCKS, of Bridgeport, in the county of Fairfield and in the State of Connecticut, have invented certain new and useful Improvements in Tacks; and do hereby declare that the following is a full, clear, and exact description thereof, reference being had to the accompanying drawings, and to the letters of reference marked thereon, making a part of this specification.

My invention relates to tacks used for any purpose whatever; and it consists in providing a tack with a rubber head molded or otherwise formed around the ordinary head of the tack, as will be hereinafter more fully set forth.

In order to enable others skilled in the art to which my invention appertains to make and use the same, I will now proceed to describe its construction and operation, referring to the annexed drawing, which represents a side view of a tack, with the rubber head in section.

A represents the head, and B the shank or body, of an ordinary tack, constructed in any suitable manner. Over the head A is molded or otherwise formed a rubber head, C, in such a manner as to be permantly united thereto.

A tack provided with a rubber head may be used for any purpose that the ordinary tacks are used, and can be used in places and on articles where the ordinary tacks would cause defacement or injury. It is especially useful as a fender to receive or cushion a blow, and may be used very successfully by carriage makers to prevent the door of a coach from rattling. It is more easily applied as a bumper, and takes up less room.

I do not confine myself to any particular size of tacks, but may apply the invention to any size of tack or nail.

I am aware that prop-nuts and rivets, having heads covered with vulcanized rubber, are not new; but I am not aware that a tack covered with an elastic rubber head has ever before been used.

Having thus fully described my invention, what I claim as new, and desire to secure by Letters Patent, is—

As an article of manufacture a soft-rubber head, combined with a pointed shank, the rubber head being molded around the shank and tack head, as set forth.

In testimony that I claim the foregoing I have hereunto set my hand this 27th day of September 1875.

ENOCH P. HINCKS.

Witnesses:
J. S. GRIFFITH,
F. W. BENHAM.